United States Patent
Lu et al.

(10) Patent No.: US 11,224,866 B2
(45) Date of Patent: Jan. 18, 2022

(54) TRICOBALT TETRAOXIDE DODECAHEDRON/CARBON NITRIDE NANOSHEET COMPOSITE AND APPLICATION THEREOF IN EXHAUST GAS TREATMENT

(71) Applicant: SOOCHOW UNIVERSITY, Suzhou (CN)

(72) Inventors: Jianmei Lu, Suzhou (CN); Dongyun Chen, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 100 days.

(21) Appl. No.: 16/859,920

(22) Filed: Apr. 27, 2020

(65) Prior Publication Data

US 2020/0338534 A1 Oct. 29, 2020

(30) Foreign Application Priority Data

Apr. 28, 2019 (CN) .......................... 201910351490.2

(51) Int. Cl.
| | |
|---|---|
| *B01J 27/24* | (2006.01) |
| *B01D 53/94* | (2006.01) |
| *B01J 23/75* | (2006.01) |
| *B01J 35/00* | (2006.01) |
| *B01J 37/00* | (2006.01) |
| *B01J 37/04* | (2006.01) |
| *B01J 37/06* | (2006.01) |
| *B01J 37/08* | (2006.01) |
| *B01J 37/34* | (2006.01) |

(52) U.S. Cl.
CPC .......... *B01J 27/24* (2013.01); *B01D 53/9413* (2013.01); *B01J 23/75* (2013.01); *B01J 35/004* (2013.01); *B01J 35/0013* (2013.01); *B01J 37/009* (2013.01); *B01J 37/04* (2013.01); *B01J 37/06* (2013.01); *B01J 37/088* (2013.01); *B01J 37/343* (2013.01); *B01D 2255/20746* (2013.01); *B01D 2255/802* (2013.01); *B01D 2255/91* (2013.01)

(58) Field of Classification Search
CPC ........ B01J 27/24; B01J 23/75; B01J 35/0013; B01J 35/004; B01J 37/009; B01J 37/04; B01J 37/06; B01J 37/088; B01J 37/373; B01D 53/9413; B01D 2255/20746; B01D 2255/802; B01D 2255/91

USPC .................................. 502/182, 185, 200, 325
See application file for complete search history.

(56) References Cited

U.S. PATENT DOCUMENTS

| | | | |
|---|---|---|---|
| 10,987,659 B1 * | 4/2021 | Kadi | B01J 21/063 |
| 2019/0020028 A1 * | 1/2019 | Wang | D04H 3/03 |
| 2019/0376195 A1 * | 12/2019 | Aziz | C01G 51/04 |
| 2020/0376475 A1 * | 12/2020 | Li | B01J 31/1815 |

FOREIGN PATENT DOCUMENTS

| | | | | |
|---|---|---|---|---|
| CN | 10 5195196 | * | 12/2015 | B01J 27/24 |
| CN | 10 6622324 | * | 5/2017 | B01J 27/24 |
| CN | 10 7433203 | * | 12/2017 | B01J 27/24 |
| CN | 10 4752062 | * | 7/2018 | H01G 9/042 |
| CN | 10 9850850 | * | 6/2019 | B82Y 40/00 |
| CN | 10 9921039 | * | 6/2019 | B01M 12/06 |
| CN | 11 0048128 | * | 7/2019 | H01M 4/88 |
| CN | 11 0065972 | * | 7/2019 | C01G 51/04 |
| WO | WO 2017/168126 | * | 10/2017 | H01M 4/86 |

OTHER PUBLICATIONS

Bo Yu et al., "Synthesis of hollow TiO2@g-C3N4/CoO3O4 core-shell microspheres for effective photooxidation degradation of tetracycline and MO." Ceramics International 46, pp. 13133-13143. (Year: 2020).*

* cited by examiner

*Primary Examiner* — Patricia L. Hailey
(74) *Attorney, Agent, or Firm* — SZDC Law P.C.

(57) ABSTRACT

The invention discloses a visible light responsive tricobalt tetraoxide dodecahedron/carbon nitride nanosheet composite and an application thereof in exhaust gas treatment. The preparation method of the composite comprises the following steps: with urea as a precursor, carrying out twice calcination to obtain carbon nitride nanosheet; dispersing the carbon nitride nanosheet into methanol, sequentially adding cobalt nitrate hexahydrate and 2-methylimidazole, and carrying out a reaction to obtain a carbon nitride nanosheet composite; and calcining the carbon nitride nanosheet composite in an air atmosphere at a low temperature to obtain the tricobalt tetraoxide dodecahedron/carbon nitride nanosheet composite. The in-situ growth synthesis method can ensure that the tricobalt tetraoxide obtained by follow-up calcination is uniformly coated on the carbon nitride nanosheet to improve the catalytic performance; the low temperature calcination ensures that the carbon nitride can maintain its wrinkle state and chemical structure during the calcination process.

11 Claims, 5 Drawing Sheets

TRICOBALT TETRAOXIDE DODECAHEDRON/CARBON NITRIDE NANOSHEET COMPOSITE AND APPLICATION THEREOF IN EXHAUST GAS TREATMENT

This application claims priority to Chinese Patent Application No.: 201910351490.2, filed on Apr. 28, 2020, which is incorporated by reference for all purposes as if fully set forth herein.

FIELD OF THE INVENTION

The present invention belongs to the technical field of nano composite materials, and particularly relates to a preparation method of visible light responsive tricobalt tetraoxide dodecahedron/carbon nitride nanosheet composite and its application in exhaust gas treatment.

TECHNICAL BACKGROUND

Due to the burning of chemical fuels, the production of chemical intermediates and the uncontrolled emission of automobile exhaust, global exhaust emissions have increased year by year, accounting for about 90% of the total anthropogenic emissions, causing great harm to humanity, animals and plants. In addition, the exhaust gas also causes environmental pollution such as acid rain, acid mist and photochemical smog. The problem of exhaust gas pollution needs to be solved urgently.

SUMMARY OF THE INVENTION

The object of the present invention is to provide a tricobalt tetraoxide dodecahedron/carbon nitride nanosheet composite, its preparation method and application thereof in exhaust gas treatment.

In order to achieve the above object, the present invention adopts the following specific technical solutions:

A visible light responsive tricobalt tetraoxide dodecahedron/carbon nitride nanosheet composite, the preparation method of which comprises the following steps:

(1) with urea as a precursor, carrying out twice calcination to obtain carbon nitride nanosheet;

(2) dispersing the carbon nitride nanosheet into methanol, sequentially adding cobalt nitrate hexahydrate and 2-methylimidazole, and carrying out a reaction to obtain a carbon nitride nanosheet composite;

(3) calcining the carbon nitride nanosheet composite in an air atmosphere at a low temperature to obtain the tricobalt tetraoxide dodecahedron/carbon nitride nanosheet composite.

A carbon nitride nanosheet composite, the preparation method of which comprises the following steps:

(1) with urea as a precursor, carrying out twice calcination to obtain carbon nitride nanosheet;

(2) dispersing the carbon nitride nanosheet into methanol, sequentially adding cobalt nitrate hexahydrate and 2-methylimidazole, and carrying out a reaction to obtain a carbon nitride nanosheet composite.

A method for treating exhaust gas, comprising the following steps:

(1) with urea as a precursor, carrying out twice calcination to obtain carbon nitride nanosheet;

(2) dispersing the carbon nitride nanosheet into methanol, sequentially adding cobalt nitrate hexahydrate and 2-methylimidazole, and carrying out a reaction to obtain a carbon nitride nanosheet composite;

(3) calcining the carbon nitride nanosheet composite in an air atmosphere at a low temperature to obtain the tricobalt tetraoxide dodecahedron/carbon nitride nanosheet composite;

(4) letting the gas containing exhaust gas flow through the tricobalt tetraoxide dodecahedron/carbon nitride nanosheet composite, and the exhaust gas treatment is realized under illumination.

In the present invention, the exhaust gas is nitric oxide; the light is a xenon lamp.

In the present invention, the tricobalt tetraoxide dodecahedron is grown in-situ on the carbon nitride nanosheet. Specifically, dispersing the carbon nitride nanosheet in methanol, adding a methanol solution of cobalt nitrate hexahydrate after ultrasonic treatment, and adding a methanol solution of 2-methylimidazole after a second ultrasonic treatment, then magnetic stirring and standing; then, after centrifugation, washing and drying to obtain the carbon nitride nanosheet composite. Preferably, the drying temperature is 60 to 80° C.

In the above technical solution, in the step (1), the first calcination is carried out in air, the heating rate during calcination is 2.5° C./min, the calcination time is 4 hours, and the calcination temperature is 550° C.; the second calcination is carried out in air, the heating rate during calcination is 5° C./min, the calcination time is 2 hours, and the calcination temperature is 500° C. With twice calcination, a wrinkled carbon nitride nanosheet can be obtained.

In the above technical solution, in the step (2), the mass ratio of the carbon nitride nanosheet, cobalt nitrate hexahydrate and 2-methylimidazole is (0.5-1):1:1.5. The reaction is carried out at room temperature, the ultrasonic treatment and the second ultrasonic treatment is 1 hour in total, the magnetic stirring time is 2 hours, and the standing time is 24 hours. Preferably; dispersing the carbon nitride nanosheet in methanol, after ultrasonic treatment for 30 min, adding a methanol solution of cobalt nitrate hexahydrate, and after a second ultrasonic treatment for 30 min, adding a methanol solution of 2-methylimidazole, then magnetic stirring for 1 hour and standing for 24 hours at room temperature. The tricobalt tetraoxide dodecahedron formed is uniformly coated on the carbon nitride nanosheet, and is convenient for the further preparation of tricobalt tetraoxide.

In the above technical solution, in the step (3), the temperature of the low temperature calcination is 300° C., the time is 3 hours, and the heating rate is 2° C./min.

The present invention further discloses the application of the above-mentioned tricobalt tetraoxide dodecahedron/carbon nitride nanosheet composite in photocatalytic treatment of exhaust gas or preparation of photocatalytic exhaust gas treatment agent; and the application of the above-mentioned carbon nitride nanosheet composite in photocatalytic treatment of exhaust gas or preparation of photocatalytic exhaust gas treatment agent.

Advantages of the Present Invention

1. The present invention adopts the method of in-situ growth and low-temperature calcination to prepare the catalyst, and the preparation process is simple, the raw materials are abundant and easy to be obtained, and the industrial production is convenient. The in-situ growth synthesis method can ensure that the subsequently calcined tricobalt tetraoxide is uniformly coated on the carbon nitride nanosheet to improve the catalytic performance; the low temperature calcination ensures that the carbon nitride can maintain its wrinkle state and chemical structure during the calcination process.

2. The tricobalt tetraoxide dodecahedron/carbon nitride nanosheet composite disclosed in the present invention can enhance the visible light response range of the single carbon nitride, and the formation of the heterojunction facilitates the separation the photogenerated electron-hole pairs and exerts respective redox reactions to improve the catalytic efficiency. Since the tricobalt tetraoxide retains a large specific surface area, it can generate more catalytic oxidation active sites and improve the degradation performance. In addition, the hollow mesoporous tricobalt tetraoxide facilitates the circulation and adsorption of the exhaust gas, and this special structure ensures sufficient catalytic degradation of the exhaust gas.

3. The present invention combines the metal organic framework with the two-dimensional material, and the specific surface area and the adsorption capacity of the material are enlarged after low-temperature calcination so as to get great significance in the use of the semiconductor photocatalyst in environmental treatment.

DETAILED DESCRIPTION OF THE INVENTION

The present invention discloses a preparation method of a visible light responsive tricobalt tetraoxide dodecahedron/carbon nitride nanosheet composite, comprises the following steps:

(1) with urea as a precursor, carrying out twice calcination to obtain carbon nitride nanosheet;

(2) dispersing the carbon nitride nanosheet into methanol, sequentially adding cobalt nitrate hexahydrate and 2-methylimidazole, and carrying out a reaction to obtain a carbon nitride nanosheet composite;

(3) calcining the carbon nitride nanosheet composite in an air atmosphere at a low temperature to obtain the tricobalt tetraoxide dodecahedron/carbon nitride nanosheet composite.

Embodiment 1

Figure 1:
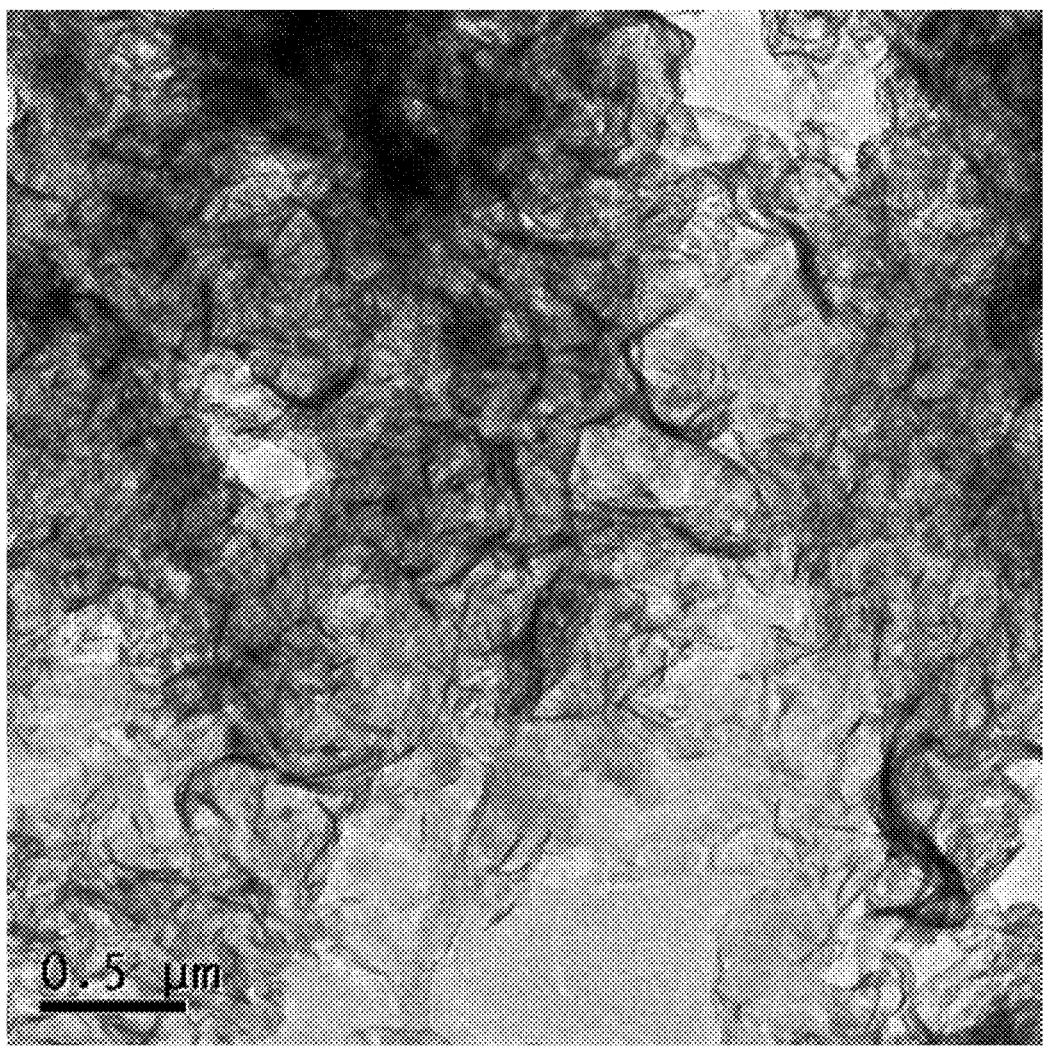
FIG. 1 is a Transmission electron microscopy image of the carbon nitride nanosheet.

The preparation of carbon nitride nanosheet, with the steps as follows:

30 g of urea is placed in a crucible with cover and calcined in the muffle furnace in air. The temperature is raised to 550° C. at a heating rate of 2.5° C./min. The calcination time is 4 h, and the bulk carbon nitride is prepared after annealing; the bulk carbon nitride is placed on the bottom of the square porcelain boat without a cover, and continues to be calcined in the air atmosphere in the muffle furnace. The heating rate is raised to 500° C. at a heating rate of 5° C./min, and the calcination time is 2 h. The pleated carbon nitride nanosheet is obtained by high-temperature calcination. FIG. 1 is a Transmission electron microscopy image of the carbon nitride nanosheet.

Embodiment 2

Figure 2:
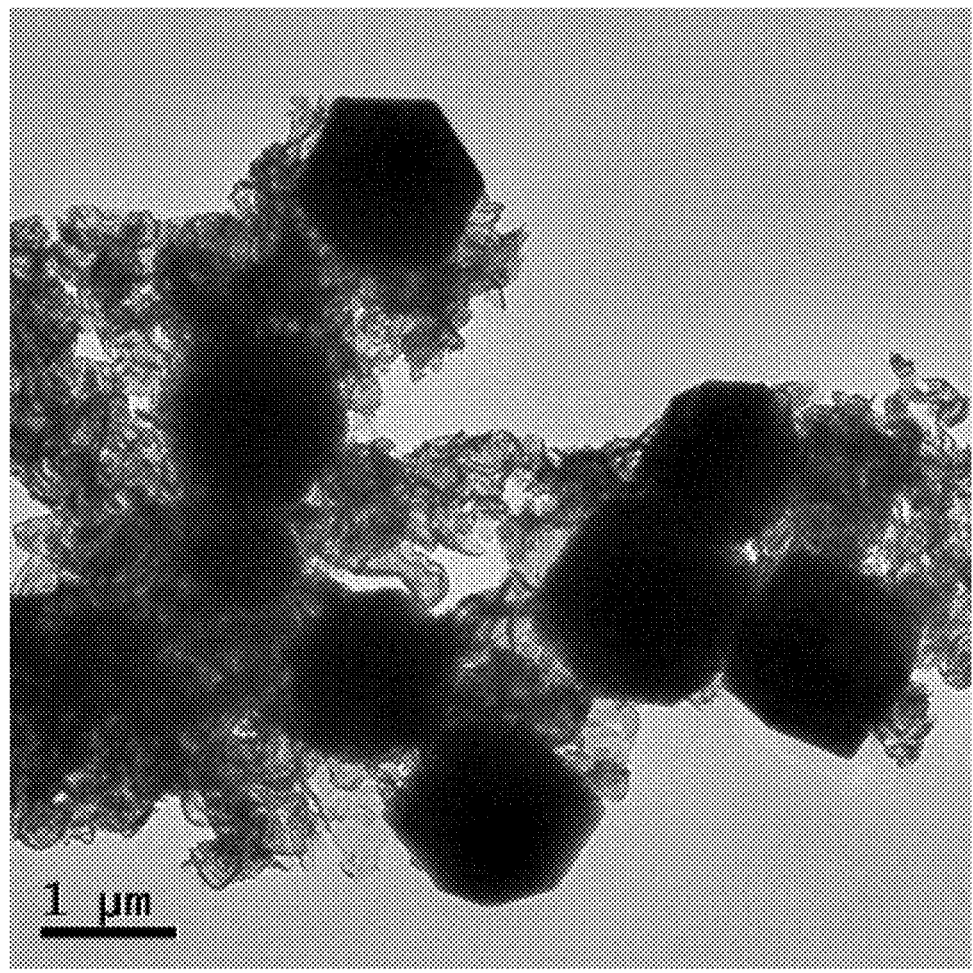
FIG. 2 is a Transmission electron microscopy image of carbon nitride nanosheet composite.

The preparation of the carbon nitride nanosheet composite is as follows:

The carbon nitride nanosheet composite is synthesized by in situ growth. 0.06 g of carbon nitride nanosheet are uniformly dispersed in 15 ml of methanol for 30 min, then 5 ml of cobalt nitrate hexahydrate solution (12 mg/ml) is added to the suspension of the above carbon nitride nanosheet, and sonication is continued for 30 min. The suspension of carbon nitride nanosheet combined with divalent cobalt ions is obtained. Thereafter, the 2-methylimidazole methanol solution (5 ml, 18 mg/ml) is slowly poured into the above suspension, and the mixture is magnetically stirred at room temperature for 1 hour, and then allowed to stand for 24 hours. Finally, the purple product carbon nitride nanosheet composite is obtained after centrifugation and ishing three times with methanol, and dried at 60° C. overnight (24 hours. The above composite is collected for the preparation of the tricobalt tetraoxide/carbon nitride nanosheet composite; FIG. 2 is a Transmission electron microscopy image of the carbon nitride nanosheet composite.

Embodiment 3

Figure 3:
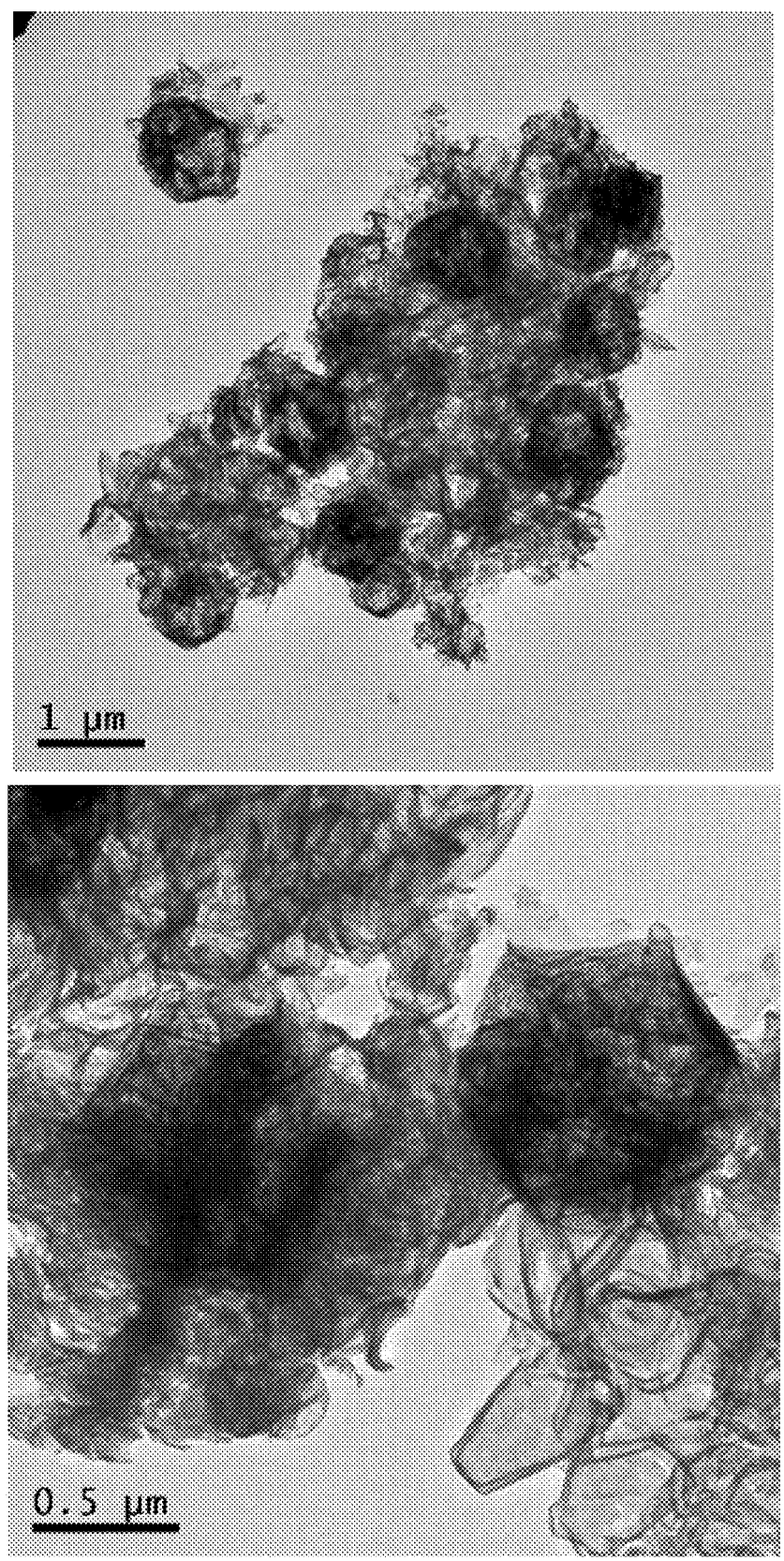
FIG. 3 is a Transmission electron microscopy image of the tricobalt tetraoxide dodecahedron/carbon nitride nanosheet composite.
Figure 4:
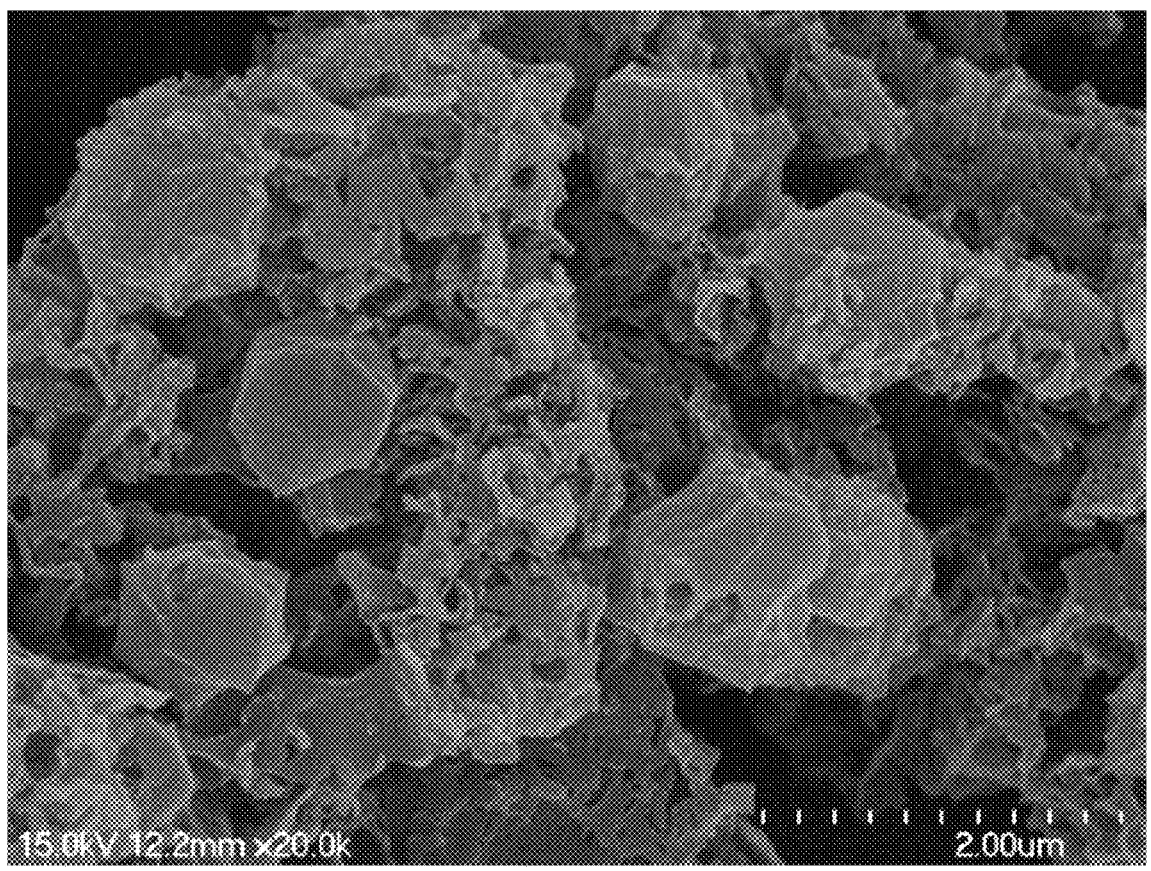
FIG. 4 is a Scanning electron microscopy image of the tricobalt tetraoxide dodecahedron/carbon nitride nanosheet composite.

Preparation of the tricobalt tetraoxide/carbon nitride nanosheet composite is as follows:

The purple product carbon nitride nanosheet composite obtained in Embodiment 2 is laid flat on the bottom of a square porcelain boat, and calcined in a muffle furnace air atmosphere, the calcination temperature is 300° C., the calcination time is 3 h, and the heating rate is 2° C./min, the tricobalt tetraoxide/carbon nitride nanosheet composite is obtained after annealing. The obtained tricobalt tetraoxide/carbon nitride nanosheet composite is recorded as CN—CO, and the content can be obtained according to the difference in the mass of the added tricobalt tetraoxide precursors (the amount of 2-methylimidazole is 1.5 times the mass of cobalt nitrate hexahydrate). Different tricobalt tetraoxide/carbon nitride nanosheet composite materials are obtained, including CN—CO-60, CN—CO-80, CN—CO-100, CN—CO-120, wherein CN—CO-60 represents the mass of tricobalt tetraoxide precursors (cobalt hexahydrate) are 60 mg; FIG. 3 is a Transmission electron microscopy image of the tricobalt tetraoxide/carbon nitride nanosheet composite; FIG. 4 is a Scanning electron microscopy image of the tricobalt tetraoxide/carbon nitride nanosheet composite.

Embodiment 4

Figure 5:
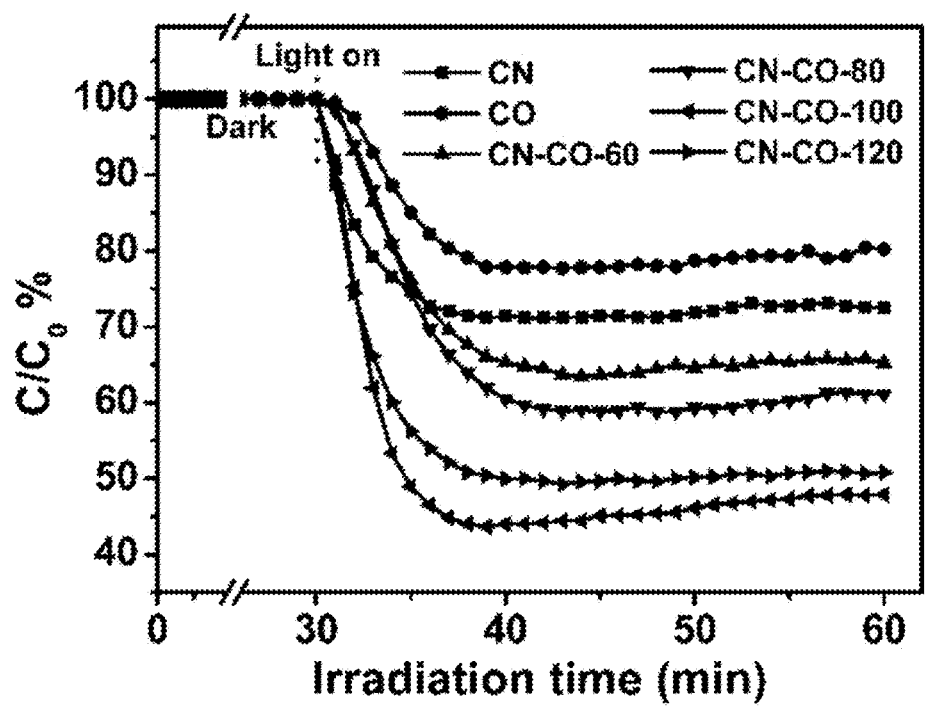
FIG. 5 is a catalytic effect diagram of carbon nitride nanosheet, tricobalt tetraoxide and tricobalt tetraoxide/carbon nitride nanosheet composite with different loading qualities.

The specific steps of the photocatalytic degradation are as follows:

100 mg of the catalyst to be tested is plated on a cardboard in a closed cylindrical detection chamber with a volume of 2.26 L, and a 300 W xenon lamp is placed vertically above it. The gas flow concentration is controlled to be 600 ppb by mixing the air in the compression bottle with nitric oxide, and passed through the reaction chamber at a flow rate of 1.2 L/min. When the catalyst reached the adsorption-desorption equilibrium (about 30 min), the xenon lamp is turned on and photocatalytic measurements are started on the NOx analyzer. The measurement time is 30 min, the sampling interval is 1 min, and a total of 30 sets of data are output; FIG. 5 is a catalytic effect diagram of carbon nitride nanosheet (labeled as CN), tricobalt tetraoxide (labeled as CO) and tricobalt tetraoxide/carbon nitride nanosheet composite with different loading qualities; the concentration ratio is the ratio of the concentration of nitric oxide to the concentration of the starting nitric oxide during the test. It can be seen from the figure that the degradation effect of pure carbon nitride is 33%, and the degradation effect of up to 57% can be achieved by adjusting the mass of the supported tricobalt tetraoxide, indicating the enhanced effect of the tricobalt tetraoxide/carbon nitride nanosheet. If the carbon nitride nanosheet composite of Embodiment 2 is used, the degradation effect is 28%, but it is lower than the prior art CN109331859A, which discloses a different structure of carbon nitride-cobalt tetraoxide prepared in different ways, and its degradation effect is 30%; the prior art CN103243388A discloses a different structure of carbon nitride-cobalt tetraoxide prepared in different ways, and its degradation effect is 35%. After experiments, it can be shown that the amount of raw materials will have an impact on the product structure, and then on the performance of the product. The key is that the different preparation methods of tricobalt tetraoxide/carbon nitride products are different and have different application properties.

Figure 6:
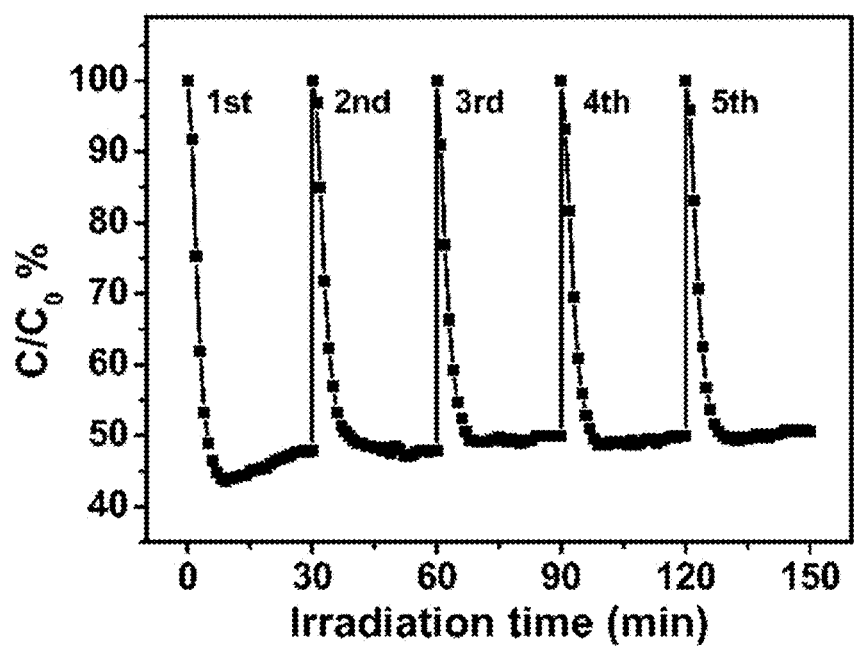
FIG. 6 is a catalytic cycle diagram of the tricobalt tetraoxide/carbon nitride nanosheet composite.

FIG. 6 is a catalytic cycle diagram of the tricobalt tetraoxide/carbon nitride nanosheet composite. After five cycles, the degradation effect is only reduced by 6%, indicating that its stability is better.

The invention discloses a visible light responsive the tricobalt tetraoxide/carbon nitride nanosheet composite. The catalytic mechanism is simple, the energy consumption is low, and the product is easy to recycle, which make it widely used in exhaust gas treatment. At the same time, carbon nitride nanosheet is used as the based catalyst to load various cocatalysts due to its excellent light absorption performance and catalytic efficiency. The formation of heterojunctions improves the catalytic performance. Semiconductor composites have practical applications in the field of exhaust gas treatment because they enhance the visible light response range and inhibit the recombination of electron-hole pairs.

We claim:

1. A method for preparing a visible light responsive tricobalt tetraoxide dodecahedron/carbon nitride nanosheet composite, comprising the following steps:
   (1) with urea as a precursor, carrying out twice calcination to obtain carbon nitride nanosheet;
   (2) dispersing the carbon nitride nanosheet into methanol, sequentially adding cobalt nitrate hexahydrate and 2-methylimidazole, and carrying out a reaction to obtain a carbon nitride nanosheet composite;
   (3) calcining the carbon nitride nanosheet composite in an air atmosphere at a low temperature to obtain the tricobalt tetraoxide dodecahedron/carbon nitride nanosheet composite.

2. The method according to claim 1, wherein in the step (1), the first calcination is carried out in air, the heating rate during calcination is 2.5° C./min, the calcination time is 4 hours, and the calcination temperature is 550° C.; the second calcination is carried out in air, the heating rate during calcination is 5° C./min, the calcination time is 2 hours, and the calcination temperature is 500° C.

3. The method according to claim 1, wherein in the step (2), the mass ratio of the carbon nitride nanosheet, cobalt nitrate hexahydrate and 2-methylimidazole is (0.5-1):1:1.5.

4. The method according to claim 1, wherein the step (2) comprises: dispersing the carbon nitride nanosheet in methanol, preparing a methanol solution of cobalt nitrate hexahydrate, conducting a first ultrasonic treatment, adding the methanol solution of cobalt nitrate hexahydrate after the first ultrasonic treatment, preparing a methanol solution of 2-methylimidazole, conducting a second ultrasonic treatment, and adding the methanol solution of 2-methylimidazole after the second ultrasonic treatment, then magnetic stirring and standing; then, after centrifugation, washing and drying to obtain the carbon nitride nanosheet composite.

5. The method according to claim 4, wherein in the step (2), the time of the first ultrasonic treatment and the second ultrasonic treatment is 1 hour in total, the magnetic stirring time is 2 hours, and the standing time is 24 hours; the drying temperature is 60 to 80° C.

6. The method according to claim 1, wherein in the step (3), the temperature of the low temperature calcination is 300° C., the time is 3 hours, and the heating rate is 2° C./min.

7. A visible light responsive tricobalt tetraoxide dodecahedron/carbon nitride nanosheet composite prepared according to the method of claim 1.

8. A method for preparing a carbon nitride nanosheet composite, comprising the following steps:
   (1) with urea as a precursor, carrying out twice calcination to obtain carbon nitride nanosheet;
   (2) dispersing the carbon nitride nanosheet into methanol, sequentially adding cobalt nitrate hexahydrate and 2-methylimidazole, and carrying out a reaction to obtain a carbon nitride nanosheet composite.

9. The method according to claim 8, wherein in the step (1), the first calcination is carried out in air, the heating rate during calcination is 2.5° C./min, the calcination time is 4 hours, and the calcination temperature is 550° C.; the second calcination is carried out in air, the heating rate during calcination is 5° C./min, the calcination time is 2 hours, and the calcination temperature is 500° C.; in the step (2), the mass ratio of the carbon nitride nanosheet, cobalt nitrate hexahydrate and 2-methylimidazole is (0.5-1):1:1.5; the step (2) comprises: dispersing the carbon nitride nanosheet in methanol, preparing a methanol solution of cobalt nitrate hexahydrate, conducting a first ultrasonic treatment, adding the methanol solution of cobalt nitrate hexahydrate after the first ultrasonic treatment, preparing a methanol solution of 2-methylimidazole, conducting a second ultrasonic treatment, and adding the methanol solution of 2-methylimidazole after the second ultrasonic treatment, then magnetic stirring and standing; then, after centrifugation, washing and drying to obtain the carbon nitride nanosheet composite.

10. The method according to claim 9, wherein in the step (2), the time of the first ultrasonic treatment and the second ultrasonic treatment is 1 hour in total, the magnetic stirring time is 2 hours, and the standing time is 24 hours; the drying temperature is 60 to 80° C.

11. A carbon nitride nanosheet composite prepared according to the method of claim 8.

* * * * *